No. 775,334. PATENTED NOV. 22, 1904.
B. G. LAMME.
ALTERNATING CURRENT ELECTRIC MOTOR.
APPLICATION FILED FEB. 27, 1904.
NO MODEL.

WITNESSES:
Fred H. Miller
Otto S. Schairer

INVENTOR
Benjamin G. Lamme
BY
Wesley G. Carr
ATTORNEY

No. 775,334. Patented November 22, 1904.

UNITED STATES PATENT OFFICE.

BENJAMIN G. LAMME, OF PITTSBURG, PENNSYLVANIA, ASSIGNOR TO WESTINGHOUSE ELECTRIC & MANUFACTURING COMPANY, A CORPORATION OF PENNSYLVANIA.

ALTERNATING-CURRENT ELECTRIC MOTOR.

SPECIFICATION forming part of Letters Patent No. 775,334, dated November 22, 1904.

Application filed February 27, 1904. Serial No. 195,687. (No model.)

*To all whom it may concern:*

Be it known that I, BENJAMIN G. LAMME, a citizen of the United States, and a resident of Pittsburg, in the county of Allegheny and State of Pennsylvania, have invented a new and useful Improvement in Alternating-Current Electric Motors, of which the following is a specification.

My invention relates to electric motors adapted for operation by means of alternating currents, and particularly to motors of this general class which are provided with commutators.

The object of my invention is to provide neutralizing and magnetizing windings for the field-magnets of alternating-current motors of the type above indicated which shall be so constructed and disposed with reference to each other that the magnetizing-coils may be placed in position and removed without disturbing the neutralizing-winding.

It has heretofore been proposed to operate electric motors having commutators by means of alternating currents, and such operation has been undertaken successfully where the structure of the motor has been properly modified from the usual direct-current type to accommodate it to the conditions incident to the use of alternating currents. One of the usual features of such motors is a supplemental winding for the field-magnet which extends through slots in the field-magnet pole-pieces in such locations as to neutralize the cross-induction from the armature, the main or magnetizing field-magnet winding being in the form of coils which surround the pole-pieces, as is usual in direct-current motors. Under proper conditions the ampere-turns of the neutralizing-winding in any one pole-piece are substantially equal to the ampere-turns of that section of the armature which is directly beneath or adjacent to such neutralizing-winding. The entire neutalizing-winding may be connected in series with the armature and in a series motor may be also connected in series with the main or exciting winding of the field-magnet.

As the neutralizing-winding is located in slots adjacent to the pole-faces, it will generally be a tedious and somewhat-complicated operation to replace or repair it, and I have therefore devised the construction herein set forth, whereby the main or exciting field-magnet winding may be removed from the field-magnet pole-pieces without disturbing the neutralizing-winding.

Figure 1:
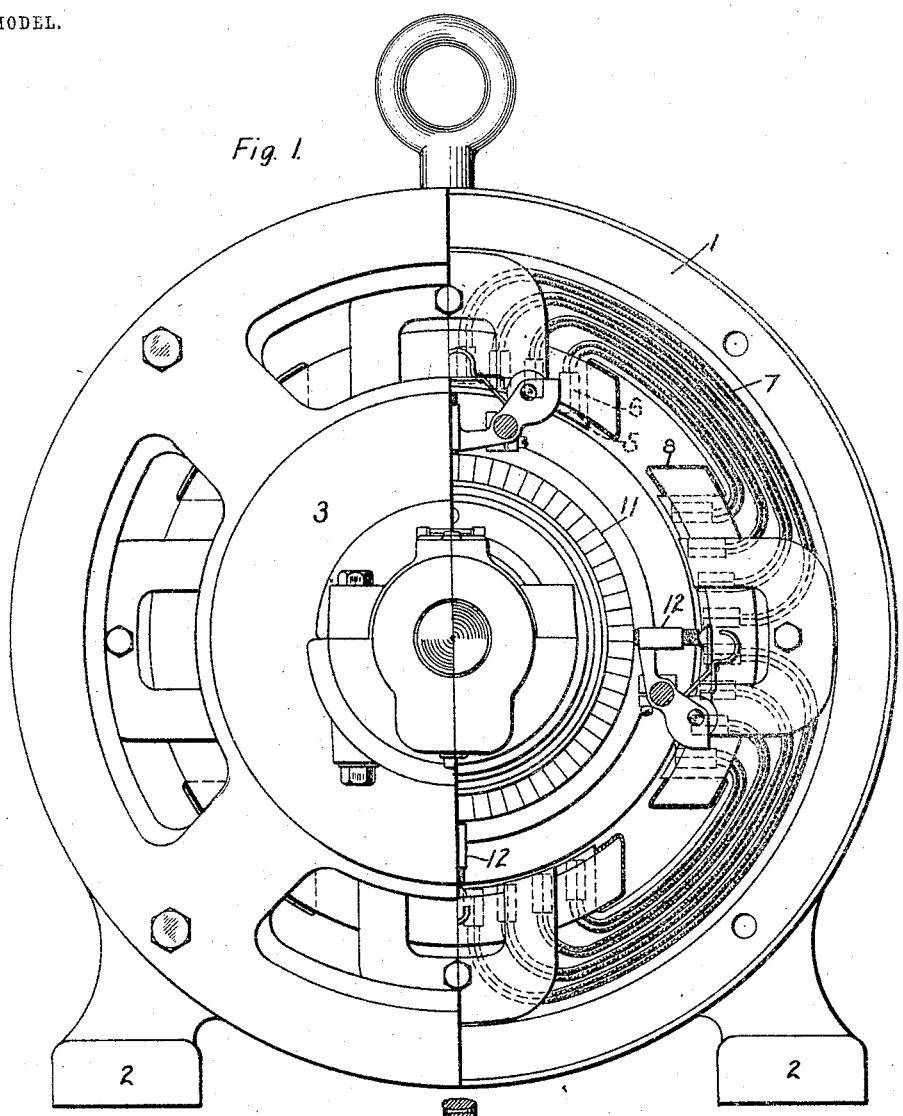
Figure 2:
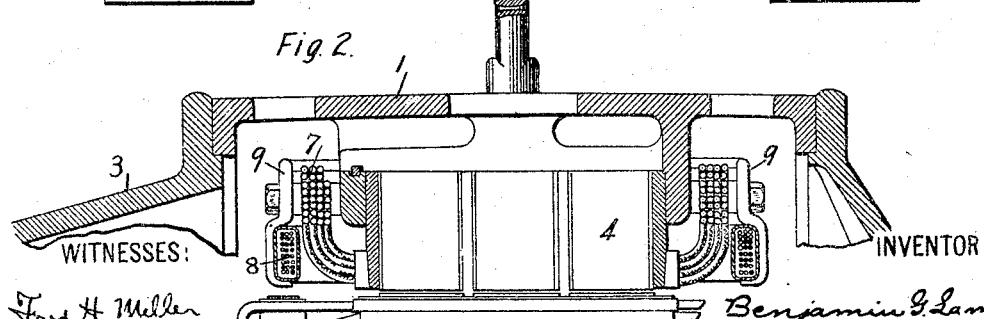

In the accompanying drawings, Figure 1 is an end elevation of a motor constructed in accordance with my invention, one-half of the end casting or cap being removed. Fig. 2 is a section through one of the pole-pieces and its coils, one armature-coil being also shown, but the greater portion of the motor being omitted.

As here indicated, the motor-frame comprises a substantially cylindrical body portion 1, having supporting-legs 2 and provided at its ends with open-work caps 3.

While the invention is not limited to a motor having a specific number of poles, I have here indicated a four-pole motor, each of the laminated field-magnet pole-pieces 4 of which is provided with eight slots 5 adjacent to its face, in which are located neutralizing-conductors 6. One half of the neutralizing-conductors in each pole-piece are connected to the neutralizing-conductors which are located in the slots of the adjacent half of the adjacent pole-piece by means of portions 7, which may be either integral extensions of the conductors that are located in the pole-piece slots or separately-constructed connectors that are suitably fastened to the projecting ends of said core-slot conductors. In order that the end portions may not interfere with the application and removal of the magnetizing-coils 8, they are bent outward in a plane substantially parallel to the end of the motor and then around the adjacent space between the pole-pieces, so that none of them cross such space. While I have shown each of the field-magnet poles as provided with eight slots in which the neutralizing-winding is located, it is obvious that the number and dimensions thereof may be varied within practical limits as may be desired or convenient.

The main or magnetizing coils 8 are of substantially the same width as the field-magnet pole-pieces, but are made of materially-greater length than the corresponding dimensions of the pole-pieces in order that they may be properly located with reference to the pole-piece faces without interfering with the end portions of the neutralizing-coils. The magnetizing-coils may be supported by means of suitable brackets 9, as indicated in Fig. 2, in such manner that they may be readily removed without disturbing or interfering with the neutralizing-winding. When thus removed, the neutralizing-winding may be readily inspected or removed for repairs as may be found necessary or desirable.

The armature 10, the commutator-drum 11, and the brushes and holders 12 may be of any desired construction suitable for use in motors of the character here shown and described, and since they do not constitute parts of my invention except in the sense and to the extent that they are parts of a complete and operative machine I do not deem it necessary or desirable to describe them in detail.

The field-magnet construction illustrated and described permits of locating the main or magnetizing coils as close to the pole-tips as may be desired, thus permitting the reduction of the diameter of the field-magnet to minimum dimensions. This is an important feature, for the reason that the field-magnet is mainly of built-up laminated material, which is expensive as compared with solid cast iron or steel. The location of the magnetizing-coils close to the pole-tips also tends to reduce the magnetic leakage or stray field around such coils. While this leakage in a direct-current motor would merely necessitate a slightly-greater cross-section of the field-magnet circuit, in an alternating-current motor it involves additional compensation, since the magnetic lines due to leakage set up a counter electromotive force in the field-magnet coils, and thus necessitate an increased input in order to compensate for such leakage. It is obvious, therefore, that the reduction of the magnetic leakage to the smallest practical limits is of particular importance in motors operated by means of alternating currents.

The form and arrangement of neutralizing and magnetizing coils here shown and described have been found admirably adapted to practical service; but I desire it to be understood that variations as to such form and relation which do not change the mode of operation and result are within the scope of my invention.

I claim as my invention—

1. An electric motor having field-magnet pole-pieces provided with slots parallel to the armature-axis, neutralizing-conductors that extend through said slots and around the spaces between the pole-pieces, and magnetizing-coils that surround the pole-pieces and the adjacent portions of the neutralizing-conductors.

2. An electric motor having slotted field-magnet pole-pieces, neutralizing-conductors that extend through the pole-piece slots and outside the spaces between the pole-pieces, and magnetizing-coils that surround said pole-pieces and the adjacent portions of the neutralizing-conductors.

3. An electric motor having neutralizing-windings applied to its pole-pieces and comprising connecting portions that extend around the spaces between the pole-pieces, and magnetizing-coils that surround the pole-pieces and the ends of the connecting portions.

4. An electric motor having slotted pole-pieces, a neutralizing-winding comprising conductors located in the pole-piece slots and connecting portions that extend around the spaces between the pole-pieces, and removably-supported magnetizing-coils that surround the pole-pieces and the adjacent ends of the connecting portions.

In testimony whereof I have hereunto subscribed my name this 23d day of February, 1904.

BENJ. G. LAMME.

Witnesses:
E. M. STEWART,
BIRNEY HINES.